United States Patent [19]

Layman et al.

[11] Patent Number: 5,623,835
[45] Date of Patent: Apr. 29, 1997

[54] SYSTEM FOR CONTROLLING AIR FLOW TO A VEHICLE AIR CONDITIONING UNIT

[75] Inventors: Robert J. Layman, Columbus; Rebecca J. Darr, New Whiteland; Jimmie J. Trushlood, Columbus, all of Ind.

[73] Assignee: Cummins Engine Company, Inc., Columbus, Ind.

[21] Appl. No.: 521,821

[22] Filed: Aug. 31, 1995

[51] Int. Cl.$^6$ .................................................. F25B 39/04
[52] U.S. Cl. .......................... 62/133; 62/184; 123/41.11
[58] Field of Search .......................... 62/133, 181, 183, 62/184, DIG. 17; 123/41.11, 41.12, 41.49; 236/35

[56] References Cited

U.S. PATENT DOCUMENTS

| | | |
|---|---|---|
| 3,853,098 | 12/1974 | Ishikawa et al. . |
| 3,894,521 | 7/1975 | Sakasegawa et al. . |
| 4,425,766 | 1/1984 | Claypole ................. 123/41.12 X |
| 4,590,772 | 5/1986 | Nose et al. ................... 62/184 |
| 4,875,521 | 10/1989 | Clemente . |
| 4,881,494 | 11/1989 | Ishigami . |
| 4,930,320 | 6/1990 | Ide et al. . |
| 5,133,302 | 7/1992 | Yamada et al. . |
| 5,285,650 | 2/1994 | Lin . |
| 5,307,644 | 5/1994 | Cummins et al. . |
| 5,359,969 | 11/1994 | Dickrell et al. . |
| 5,465,589 | 11/1995 | Bender et al. ............. 62/133 |

Primary Examiner—Harry B. Tanner
Attorney, Agent, or Firm—Woodard, Emhardt, Naughton Moriarty & McNett

[57] ABSTRACT

An engine cooling fan control system includes a vehicle speed sensor, a pressure sensor for sensing the pressure of refrigerant provided to a refrigerant condenser forming part of the vehicle air conditioning system and a controller responsive to the vehicle speed and refrigerant pressure signals to operate an engine cooling fan. The engine cooling fan is activated continuously while vehicle speed is below a first speed threshold if the refrigerant pressure exceeds a first pressure. While the vehicle speed is above the first speed threshold, but below a second speed threshold, the engine cooling fan is activated for a predetermined duration if the refrigerant pressure is above the first pressure. Finally, while the vehicle speed is above the second speed threshold, the engine cooling fan is activated in response to the refrigerant pressure exceeding the first pressure and deactivated in response to the refrigerant pressure falling below a second lower pressure.

25 Claims, 2 Drawing Sheets

SYSTEM FOR CONTROLLING AIR FLOW TO A VEHICLE AIR CONDITIONING UNIT

FIELD OF THE INVENTION

This invention relates in general to systems for controlling engine cooling air flow devices, and more specifically to systems for controlling the operation of such air flow devices under excessive refrigerant pressure conditions in heavy duty truck air conditioning systems.

BACKGROUND OF THE INVENTION

Heavy duty truck engine cooling fans typically sense the need for cooling fan operation by sensing engine coolant temperature, intake manifold air temperature and the pressure of refrigerant between the refrigerant compressor and condenser of the air conditioning system (often referred to as high-side pressure). Such fans are typically located between the truck engine and radiator, with the air conditioning system condenser and intake manifold port each disposed in the vicinity thereof. Engine cooling fans of this type are typically driven either in accordance with engine RPM, as disclosed in U.S. Pat. No. 3,853,098 to Ishikawa et al. and U.S. Pat. No. 3,894,521 to Sakasegawa et al., or by an independent electric motor as disclosed in U.S. Pat. No. 4,875,521 to Clemente and U.S. Pat. No. 4,881,494 to Ishigami.

It is known that the refrigerant high-side pressure in heavy duty vehicle air conditioning systems may become excessive under stopped and low vehicle speed conditions due to inadequate ram air flow across the condenser. Engine cooling fan operation is then required to reduce the high-side pressure to an acceptable level.

Engine cooling fan operation is typically controlled in response to high-side refrigerant pressure. Specifically, the engine cooling fan is activated when the high-side refrigerant pressure increases to a first predefined pressure range, due to inadequate air flow to the condenser. When the air flow to the condenser is increased under the influence of the engine cooling fan, the high-side pressure correspondingly decreases until it reaches a second lower predetermined pressure range, at which point the engine cooling fan is deactivated.

Under low vehicle speeds, it is known that high-side pressure increases rapidly due to inadequate ram air flow across the condenser, and decreases rapidly under the influence of the engine cooling fan. Under normal air conditioning system control, this rapid fluctuation in high-side pressure causes a corresponding rapid opening and closing of a pressure switch which, in turn, causes the engine cooling fan to correspondingly cycle on and off rapidly. Such fan cycling has the tendency to cause excessive fan clutch and fan belt wear. In addition, engine fan cycling generally causes excessive noise due to fan engagement and disengagement (attributable to fan belt and/or fan clutch squeal and other factors). Such fan engagement/disengagement is more noticeable in a heavy duty truck under stopped and idling conditions, which can be very disturbing to a heavy truck operator attempting to sleep in the cab with the air conditioning in operation.

Heretofore, it has been known to reduce engine fan cycling by utilizing a timer to maintain the fan, once activated due to excessive high-side pressure, in an activated state for a fixed time period. However, such fan operation is not needed after the vehicle has accelerated to a speed sufficient to provide adequate ram air flow past the condenser. Under such conditions, timed fan operation has the disadvantage of unnecessarily drawing power from the engine and thereby reducing fuel economy.

Another prior art approach to reducing engine fan cycling has been to provide constant fan operation, activated due to excessive refrigerant pressure, below a specified vehicle speed (typically below that which provides sufficient ram air flow). Examples of such systems are disclosed in U.S. Pat. No. 4,930,320 to Ide et al., U.S. Pat. No. 5,133,302 to Yamada et al., U.S. Pat. No. 5,285,650 to Lin and U.S. Pat. No. 5,307,644 to Cummins et al. However, such fan operation has the disadvantage of constantly drawing power from the engine at vehicle speeds wherein at least some ram air flow is provided to the condenser, so that full-time fan operation may not be necessary. Such excessive fan operation may result in reduced fuel economy.

What is therefore needed is an engine cooling fan control system that addresses the shortcomings of the prior art. Such a system should be reliable, inexpensive to implement, and readily integratable into an existing vehicle air conditioning system.

SUMMARY OF THE INVENTION

The present invention addresses the foregoing shortcomings of the prior art. In accordance with one aspect of the present invention, a system for controlling air flow to a vehicle air conditioning unit, wherein the unit includes a refrigerant condenser operable to receive pressurized refrigerant from the unit, comprises means for providing air flow to the refrigerant condenser, means for sensing the pressure of refrigerant received by the refrigerant condenser and providing a pressure signal corresponding thereto, means for sensing vehicle speed and providing a vehicle speed signal corresponding thereto, and controller means for controlling the air flow means in response to the vehicle speed and pressure signals. The controller means is operable in a first mode to continuously activate the air flow means while the vehicle speed is below a first speed threshold if the refrigerant pressure exceeds a first pressure threshold. The controller means is further operable in a second mode to activate the air flow means for a predetermined duration while the vehicle speed is above the first speed threshold but below a second higher speed threshold if the refrigerant pressure is above the first pressure threshold.

In accordance with another aspect of the present invention, a system for controlling air flow to a vehicle air conditioning unit, wherein the unit includes a refrigerant condenser operable to receive pressurized refrigerant from the unit, comprises means for providing air flow to the refrigerant condenser, means for sensing the pressure of refrigerant received by the refrigerant condenser and providing a pressure signal corresponding thereto, means for sensing vehicle speed and providing a vehicle speed signal corresponding thereto, and controller means for controlling the air flow means in response to the vehicle speed and pressure signals. The controller means is operable to activate the air flow means for a predetermined duration while the vehicle speed is below a vehicle speed threshold if the refrigerant pressure is in excess of a first pressure threshold. If the vehicle speed exceeds the vehicle speed threshold, the controller means is operable to activate the air flow means in response to the refrigerant pressure exceeding the first pressure threshold, and to deactivate the air flow means in response to the refrigerant pressure falling below a second lower pressure threshold.

In accordance with a further aspect of the present invention, a combination includes an internal combustion engine, and a system for controlling air flow to a cooling system of the internal combustion engine, wherein the engine cooling system includes a heat exchanger responsive to air flow therethrough to remove heat from fluid circulating through the engine cooling system, means for providing air flow to the heat exchanger, and a refrigerant condenser of an air conditioning unit operable to cool air within a passenger compartment of a vehicle carrying the engine, the heat exchanger being disposed between the air flow means and the condenser and the condenser being operable to receive pressurized refrigerant from the air conditioning unit. The air flow control system comprises means for sensing the pressure of refrigerant received by the refrigerant condenser and providing a pressure signal corresponding thereto, means for sensing vehicle speed and providing a vehicle speed signal corresponding thereto, and controller means for controlling the air flow means in response to the vehicle speed and pressure signals. The controller means continuously activates the air flow means while the vehicle speed is below a first speed threshold if the refrigerant pressure exceeds a first pressure threshold, and activates the air flow means for a predetermined duration while the vehicle speed is above the first speed threshold but below a second higher speed threshold if the refrigerant pressure is above the first pressure threshold.

In accordance with yet another aspect of the present invention, a method of controlling an air flow means for providing air flow to a refrigerant condenser of a vehicle air conditioning unit, wherein the refrigerant condenser is operable to receive pressurized refrigerant from the air conditioning unit, comprises the steps of: (1) determining the pressure of refrigerant received by the refrigerant condenser, (2) determining vehicle speed, (3) continuously activating the air flow means while the vehicle speed is below a first speed threshold if the refrigerant pressure is above a first pressure threshold, and (4) activating the air flow means for a predetermined duration while the vehicle speed is above the first speed threshold but below a second higher speed threshold if the refrigerant pressure is above the first pressure threshold.

In accordance with still a further aspect of the present invention, a method of controlling an air flow means for providing air flow to a refrigerant condenser of a vehicle air conditioning unit, wherein the refrigerant condenser is operable to receive pressurized refrigerant from the air conditioning unit, comprises the steps of: (1) determining the pressure of refrigerant received by the refrigerant condenser, (2) determining vehicle speed, (3) activating the air flow means for a predetermined duration while the vehicle speed is below a vehicle speed threshold if the refrigerant pressure is above a first pressure threshold, and (4) activating the air flow means in response to the refrigerant pressure being above the first pressure threshold and deactivating the air flow means in response to the refrigerant pressure falling below a second lower pressure threshold while the vehicle speed is above the vehicle speed threshold.

One object of the present invention is to provide an engine cooling fan control system operable to optimally provide air flow to a refrigerant condenser of a vehicle air conditioning system under various vehicle speed conditions.

Another object of the present invention is to provide an engine cooling fan control system operable to minimize noise due to engine cooling fan cycling under certain vehicle speed conditions.

These and other objects of the present invention will become more apparent from the following description of the preferred embodiment.

DESCRIPTION OF THE PREFERRED EMBODIMENT

Figure 1:
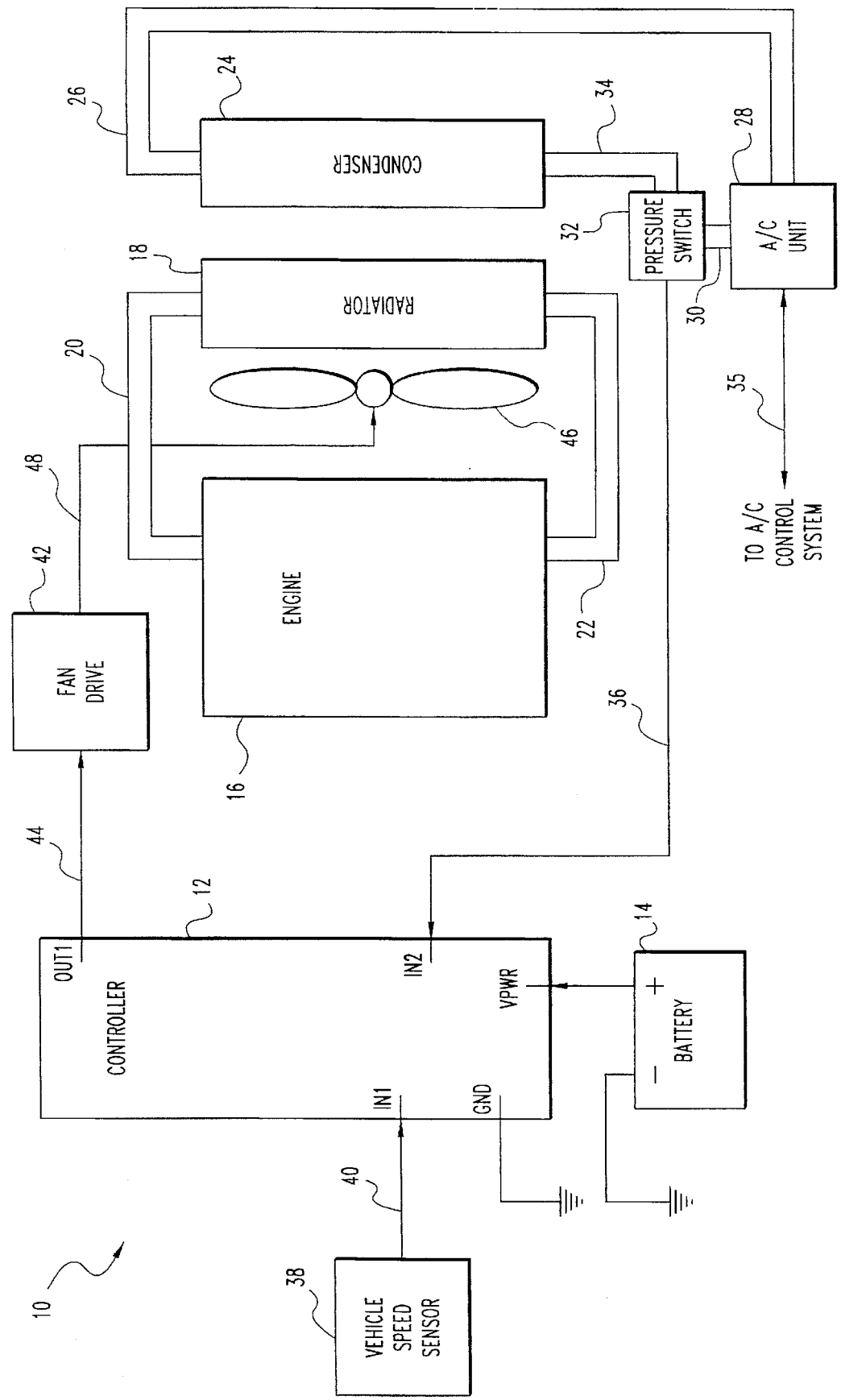
FIG. 1 is a block diagram illustration of an engine cooling fan control system in accordance with the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, a diagrammatic illustration of a microprocessor controlled engine cooling fan control system 10, in accordance with a preferred embodiment of the present invention, is shown. The system 10 includes as its central component a controller 12. Controller 12 is a microcomputer including at least a memory portion and a microprocessor portion operable to run software routines resident within memory, and to manage the overall operation of the system 10. Preferably, controller 12 is an electronic control module (ECM) of known construction and commonly used within the automotive and heavy duty truck industry.

The memory portion of controller 12 may include ROM, RAM, EPROM, EEPROM, flash, PROM, and any other type of memory known to those skilled in the art. The memory portion of controller 12 may be further supplemented by an external memory connected thereto (not shown). The external memory may include any of the memory features described with respect to the controller memory portion. An external memory may also be used to supplant the memory portion of controller 12 if controller 12 lacks such a memory portion, or if the memory portion provides inadequate storage. Finally, the microprocessor portion may include sufficient memory (including ROM and RAM) to obviate the need for any additional controller memory portion or external supplemental memory.

Controller 12 receives electrical power at input VPWR from a battery 14 either directly as shown, in which case controller 12 includes a voltage regulator portion therein, or via an external voltage regulator connected to the battery 14 (not shown). In either case, a voltage regulating function is typically provided to supply the microprocessor portion of controller 12 with an appropriate power level for logic-level operation. Typically, battery voltage is approximately 12–16 volts, but the system 10 of the present invention may be operable with battery voltages as low as 7 volts and as high as 32 volts.

Engine 16, typically a diesel engine for use with a heavy duty truck, is preferably liquid cooled. To this end, a heat exchanger, typically a radiator 18 as shown, is provided adjacent a front grill area of the vehicle, and is configured so that air may pass therethrough. Radiator 18 is connected to engine 16 via liquid passageways 20 and 22. As is known in the art, a fluid commonly known as engine coolant circulates between engine 16 and radiator 18 via passageways 20 and 22 (typically in the form of hoses). Heat from the engine 16 is transferred to the engine coolant fluid, which is, in turn, transferred to the air by the radiator 18 as air passes therethrough. In this manner, the operating temperature of liquid cooled engine 16 is maintained within a specified temperature range.

System 10 further includes an air conditioning system comprising a condenser 24, air conditioning unit 28 electrically connected to an air conditioning control system (not shown) via signal line 35, pressure switch 32, and fluid passageways 26, 30, and 34. Air conditioning unit 28 includes a refrigerant, typically Freon®, which is preferably pressurized as is known in the art. In order to transfer heat from the cab of the vehicle to the external environment, the refrigerant within air conditioning unit 28 is typically circulated through condenser 24 for cooling and back through fluid passageway 26 to air conditioning unit 28. If vehicle speed is high enough to provide sufficient ram air flow past condenser 24, it may be adequately cooled to prevent the refrigerant pressure from exceeding acceptable pressure limits. However, when the vehicle is stopped with the engine running, and at low vehicle speeds, ram air flow may be insufficient to adequately cool condenser 24. For this reason, a fan 46, driven by fan drive means 42 via electrical connection 48, is provided to cool condenser 24 as needed.

In determining whether the operation of fan 46 is needed to cool condenser 24, air conditioning unit 28 is typically fluidly connected to a pressure switch 32 via fluid line 30, and from pressure switch 32 to condenser 24 via fluid line 34. Pressure switch 32 is electrically connected, via signal line 36, to input IN2 of controller 12. In operation, as the pressure of refrigerant between air conditioning unit 28 and condenser 24, commonly referred to as high-side pressure, becomes excessive, normally closed pressure switch 32 will open, thereby providing an excessive pressure signal to controller 12. Controller 12 then provides a fan activation signal at output OUT1, which is routed to fan drive means 42 via signal line 44, and which causes fan drive means 42 to drive fan 46 and thereby provide air flow to condenser 24. As the high-side pressure is reduced to an acceptable level under the influence of fan 46, pressure switch 32 resumes its normal closed position. Fan drive means 42 may, for example, be an electric motor, although the present invention contemplates utilizing any known device and/or means responsive to a fan drive signal to activate fan 46.

Preferably, normally closed pressure switch 32 opens at between approximately 200–500 psi, and closes at a pressure of between approximately 20–475 psi. Further, although system 10 is shown utilizing a pressure switch 32 as shown and described, the present invention alternatively contemplates utilizing a pressure sensor positioned within condenser 24, fluid passageways 30 or 34, or within the air conditioning unit 28 itself. Such a pressure sensor may be utilized in a known manner to provide controller 12 with an indication of acceptable and excessive high-side pressure conditions. Controller 12 may then activate and deactivate fan 46 in accordance with signals provided by the pressure sensor. Finally, the present invention also contemplates utilizing a temperature sensor in place of such a pressure sensor, or in place of pressure switch 32, to sense the temperature of refrigerant provided to condenser 24. Using known software methods, such as a lookup table, the temperature of refrigerant provided to condenser 24 could then be correlated to pressure through known conversion techniques. Regardless of the sensing apparatus or technique, the importance of pressure switch 32 lies in its ability to alert controller 12 when high-side pressure has exceeded a first excessive pressure, and when high-side pressure has fallen below a second lower pressure.

Although system 10 is shown as having radiator 18 positioned between fan 46 and condenser 24, it is to be understood that the foregoing components may be alternatively configured, the importance of which being that the fan 46 is operable to cool both condenser 24 and radiator 18 (and intake manifold air, which is not shown in FIG. 1) when fan 46 is actuated. Further, although the preferred arrangement for providing such air flow is with a fan 46 and fan drive means 42 as shown in FIG. 1, the present invention contemplates other air flow arrangements for providing the engine cooling function described herein. For example, fan 46 may be replaced with a blower, or other forced air system, which is driven either by independent means, such as fan drive means 42, or via operation of the engine as is known in the art.

A vehicle speed sensor 38 provides a vehicle speed signal to input IN1 of controller 12 via signal line 40. Vehicle speed sensor 38 is preferably a variable reluctance sensor which senses rotational speed of a gear, or tone wheel, connected to the vehicle tail shaft, for example. It is to be understood, however, that vehicle speed may be derived from other such sensors, such as a wheel speed sensor, or the like. In any event, vehicle speed sensor 38 is preferably an analog sensor and thereby provides analog signals to controller 12. Controller 12 preferably includes a zero-crossing detector (not shown) for receiving the analog vehicle speed signal, and converting it to a signal appropriate for use by the microprocessor portion of controller 12. However, the present invention further contemplates that the vehicle speed signal may be received by an analog-to-digital converter portion of controller 12 (not shown) to convert the vehicle speed signal to a digital signal usable by the microprocessor portion of controller 12. Alternatively, an analog-to-digital converter may be provided external to controller 12 for converting the sensor signal to a digital signal. Further, although vehicle speed sensor 38 is preferably an analog sensor known in the automotive and heavy duty truck industry, the present invention also contemplates utilizing a sensor that supplies digital signals corresponding to sensed speed in order to accomplish the above-described function. Finally, the present invention further contemplates using redundant sensors within system 10 so that the system 10 may remain fully operational while awaiting service on the failed or faulty sensor.

In operation, the system 10 executes a software program several times a second, preferably every 10–100 milliseconds, to perform an engine cooling fan control algorithm in accordance with the present invention. With the aid of the flow chart of FIG. 2, the operation of system 10 in implementing the concepts of the present invention will now be described in detail.

Figure 2:
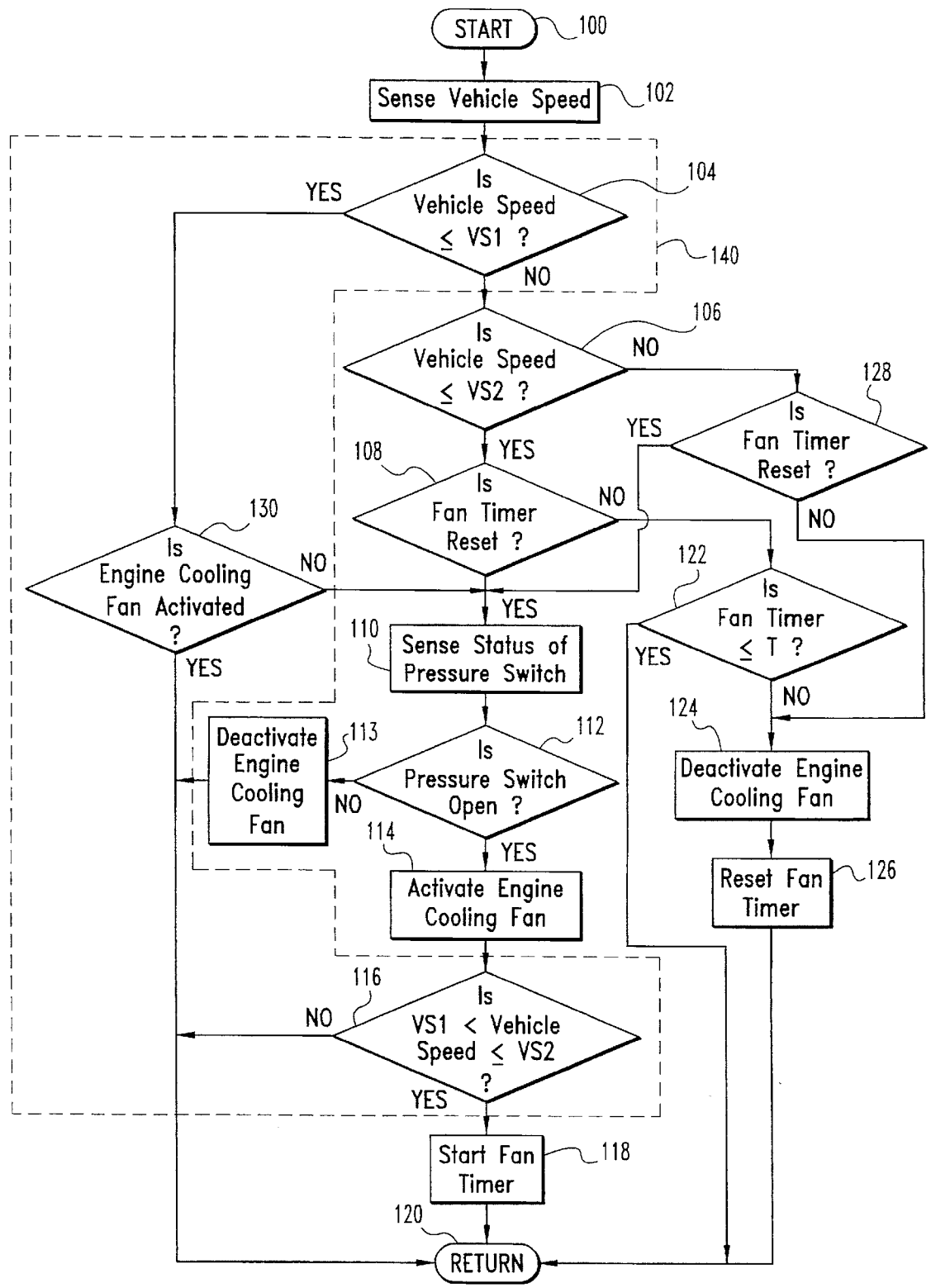
FIG. 2 is a flowchart of a preferred embodiment of an engine cooling fan control algorithm executable by a controller of the engine cooling fan control system of FIG. 1.

Referring now to FIG. 2, an engine cooling fan control software algorithm is shown. The algorithm begins at step 100 and at step 102 vehicle speed is sensed by vehicle speed sensor 38. Program execution continues thereafter at step 104 where the vehicle speed sensed at step 102 is compared with a first vehicle speed threshold VS1. Preferably, VS1 is set at a vehicle speed of between approximately 0 and 60 mph. If, at step 104, vehicle speed is less than or equal to VS1, program execution continues at step 130. If vehicle speed is greater than VS1 at step 104, program execution continues at step 106 where vehicle speed is compared with a second vehicle speed threshold VS2. Preferably, VS2 is set at a vehicle speed of between approximately 1 and 60 mph, although VS1 and VS2 values should be chosen so that VS2>VS1. If, at step 106, vehicle speed is less than or equal to VS2, program execution continues at step 108. If vehicle speed is greater than VS2 at step 106, program execution continues at step 128.

At step 108, the status of a fan timer within controller 12 is tested. If the fan timer is not in reset at step 108, program execution continues at step 122. If, at step 108, the fan timer is in reset, program execution continues at step 110 where the status of pressure switch 32 is sensed. Thereafter at step 112, the status of the pressure switch sensed at step 110 is tested. If, at step 112, the pressure switch 32 is closed, the engine cooling fan 46 is deactivated at step 113 and program execution continues thereafter at step 120. If, at step 112, pressure switch 32 is open, the engine cooling fan 46 is activated at step 114. Thereafter at step 116, the vehicle speed sensed at step 102 is again tested against speed thresholds VS1 and VS2. If vehicle speed is less than or equal to VS1, or is greater than VS2, program execution continues at step 120. If, at step 116, vehicle speed is greater than VS1 and less than or equal to VS2, the fan timer within controller 12 is started at step 118. Thereafter at step 120, program execution returns to its calling routine.

If, at step 108, the fan timer within controller 12 is not in reset, the fan timer is tested against a timer expiration time T at step 122. If, at step 122, the fan timer is less than or equal to T, program execution continues at step 120. If, at step 122, the fan timer has exceeded T, then program execution advances to step 124 where the engine cooling fan 46 is deactivated. Thereafter at step 126, the fan timer within controller 12 is reset, and program execution continues at step 120. Preferably, the fan timer limit T is set between approximately 1 and 3,600 seconds.

Referring back to step 106, if vehicle speed sensed at step 102 is greater than VS2, program execution continues at step 128 where the status of the fan timer within controller 12 is tested. If, at step 128, the fan timer is not in reset, then program execution continues at step 124 where engine cooling fan 46 is deactivated. Thereafter at step 126, the fan timer within controller 12 is reset and program execution continues at step 120. If, at step 128, the fan timer is in reset, then program execution continues at step 110.

Referring back to step 104, if the vehicle speed sensed at step 102 is less than or equal to VS1, the status of the engine cooling fan 46 is tested at step 130. If, at step 130, the engine cooling fan 46 is deactivated, program execution continues at step 110 where the status of pressure switch 32 is sensed. If, at step 130, the engine cooling fan 46 is activated, program execution continues at step 120.

From the foregoing, it is apparent that the activation of engine cooling fan 46 is dependent upon sensed vehicle speed and the status of pressure switch 32. In a first mode of operation, if vehicle speed is less than or equal to VS1, the engine cooling fan control algorithm activates engine cooling fan 46 if the high side pressure exceeds a first pressure threshold so that pressure switch 32 opens. Thereafter, engine cooling fan 46 is continuously maintained in an activated state until either the vehicle ignition (not shown) is turned off or the vehicle speed exceeds VS1, regardless of the status of pressure switch 32. This first mode of operation is advantageous in at least two respects. First, it is known that at low vehicle speed and vehicle idling conditions, the high-side refrigerant pressure between air conditioning unit 28 and condenser 24 may rapidly increase due to inadequate ram air flow to condenser 24. Operating engine cooling fan 46 under such conditions thus ensures that condenser 24 continuously receives adequate air flow. Secondly, drivers of heavy duty trucks oftentimes sleep in the cab area of the truck during long journeys. During warm weather conditions, the driver may wish to sleep with the engine running and air conditioning unit 28 operating. If the engine cooling fan control algorithm of the present invention is operating in the above-described first mode of operation, then the engine cooling fan 46 will not constantly engage and disengage under the direction of pressure switch 32. The driver will therefore not be disturbed by noise generated by such fan engagement/disengagement.

In a second mode of operation, if vehicle speed is between VS1 and VS2, the engine cooling fan control algorithm activates engine cooling fan 46 if the high side pressure exceeds the first pressure threshold so that pressure switch 32 opens. Thereafter, engine cooling fan 46 is maintained in an activated state for a predetermined duration, regardless of the status of pressure switch 32, unless the vehicle speed exceeds VS2. After expiration of the predetermined duration, controller 12 continues to monitor the status of pressure switch 32, and repeats mode 2 operation as warranted by the previously described vehicle speed and high-side pressure conditions. Thus, as long as vehicle speed is between VS1 and VS2, and the high side pressure is in excess of the first pressure threshold, controller 12 activates engine cooling fan 46 for predetermined duration intervals. If, after the expiration of any of these predetermined duration intervals, the high side pressure is below a second lower pressure threshold such that pressure switch 32 is closed, and vehicle speed is between VS1 and VS2, controller 12 will not activate engine cooling fan 46 but will continue to monitor the status of pressure switch 32, and will commence predetermined duration operation of engine cooling fan 46 if pressure switch 32 opens again. In the second mode of operation, it is recognized that since the vehicle has a velocity of at least VS1, then condenser 24 is receiving at least some ram air flow due to the vehicle speed. As such, the high-side refrigerant pressure is less likely to increase as rapidly as under extremely low vehicle speeds, or idling vehicle conditions, so that continuous operation of engine cooling fan 46 may not be necessary. The second mode of operation further recognizes a vehicle speed range wherein ram air flow through radiator 18 may be insufficient, by itself, to adequately cool condenser 24. Thus, within the vehicle speed range of VS1–VS2, engine cooling fan 46 is activated for predetermined duration intervals in response to excessive high-side pressure conditions.

The engine cooling fan control algorithm of the present invention recognizes that at vehicle speeds above VS2, ram air flow through radiator 18 is typically sufficient to cool condenser 24. As such, engine cooling fan 46 is controlled, as is known in the art, between two high-side refrigerant pressure ranges, for vehicles speeds above VS2. Specifically, while the vehicle speed is in excess of VS2, controller 12 activates engine cooling fan 46 in response to the high-side pressure exceeding a first pressure threshold, and deactivates engine cooling fan 46 in response to the high-side pressure falling below a second lower pressure threshold. In this manner, the operation of engine cooling fan 46 is minimized at vehicle speeds in excess of VS2.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. For example, the present invention contemplates an alternate embodiment of the algorithm described in FIG. 2, wherein the continuous fan mode of operation (mode 1) does not occur, and only timed fan operation (mode 2) occurs below a specified vehicle speed threshold. In FIG. 2, this is accomplished by removing the steps shown within the dashed border 140. Thus, step 102 proceeds directly to step 106, step 113 proceeds directly to step 120, and step 114 proceeds directly to step 118. With steps 104, 116, and 130 removed from the algorithm shown in FIG. 2, the resulting algorithm is operable only in the above-described second mode of operation such that timed fan operation occurs for all vehicle speeds less than VS2. Furthermore, the vehicle speed threshold value VS2 in this alternate mode of operation may be set at any vehicle speed value, but is typically set at some value below which ram air flow to condenser 24 is insufficient to keep the high-side refrigerant pressure from becoming excessive. Finally, the present invention contemplates setting VS2 such that timed fan operation occurs only at very low vehicle speeds or under idling conditions when the vehicle is stopped.

What is claimed is:

1. A system for controlling air flow to a vehicle air conditioning unit, the unit including a refrigerant condenser operable to receive pressurized refrigerant from the unit, the system comprising:

means for providing air flow to the refrigerant condenser;

means for sensing the pressure of refrigerant received by the refrigerant condenser and providing a pressure signal corresponding thereto;

means for sensing vehicle speed and providing a vehicle speed signal corresponding thereto; and controller means for controlling said air flow means in response to said vehicle speed and pressure signals, said controller means being operable in a first mode to continuously activate said air flow means while the vehicle speed is below a first speed threshold if the refrigerant pressure exceeds a first pressure threshold, and a second mode to activate said air flow means for a predetermined duration while the vehicle speed is above said first speed threshold but below a second higher speed threshold if the refrigerant pressure is above said first pressure threshold.

2. The air flow control system of claim 1 wherein said controller means is further operable to activate said air flow means in response to the refrigerant pressure exceeding said first pressure threshold, and to deactivate said air flow means in response to the refrigerant pressure falling below a second lower pressure threshold, while the vehicle speed is above said second speed threshold.

3. The air flow control system of claim 2 wherein said controller means includes a resettable timing means for timing said predetermined duration, and wherein said controller means activating said air flow means for said predetermined duration in said second mode is further conditioned upon said timing means being in a reset condition.

4. The air flow control system of claim 3 wherein said controller is is further operable in said second mode to deactivate said air flow means and reset said timing means when said predetermined duration elapses.

5. The air flow control system of claim 4 wherein said controller is further operable to deactivate said air flow means and reset said timing means, if said timing means is not in a reset condition, in response to the vehicle speed exceeding said second speed threshold.

6. The air flow control system of claim 5 wherein said means for providing air flow includes:

a fan; and a fan drive means responsive to a fan activation signal provided by said controller means to drive said fan and thereby provide air flow to the refrigerant condenser.

7. The air flow control system of claim 6 wherein said means for sensing the pressure of refrigerant received by the refrigerant condenser includes a pressure responsive switch operable between an open position and a closed position, said switch switching to said open position in response to sensing pressure in excess of said first pressure threshold, and switching to said closed position in response to sensing pressure below said second lower pressure threshold.

8. The air flow control system of claim 7 wherein said controller means is a microprocessor-based vehicle control computer.

9. A system for controlling air flow to a vehicle air conditioning unit, the unit including a refrigerant condenser operable to receive pressurized refrigerant from the unit, the system comprising:

means for providing air flow to the refrigerant condenser;

means for sensing the pressure of refrigerant received by the refrigerant condenser and providing a pressure signal corresponding thereto;

means for sensing vehicle speed and providing a vehicle speed signal corresponding thereto; and controller means for controlling said air flow means in response to said vehicle speed and pressure signals, said controller means activating said air flow means for a predetermined duration while the vehicle speed is below a vehicle speed threshold if the refrigerant pressure is above a first pressure threshold, and activating said air flow means in response to the refrigerant pressure exceeding said first pressure threshold and deactivating said air flow means in response to the refrigerant pressure falling below a second lower pressure threshold while the vehicle speed is above said vehicle speed threshold.

10. The air flow control system of claim 9 wherein said controller means includes a resettable timing means for timing said predetermined duration, and wherein said controller means activating said air flow means for said predetermined duration is further conditioned upon said timing means being in a reset condition.

11. The air flow control system of claim 10 wherein said controller is is further operable to deactivate said air flow means and reset said timing means when said predetermined duration elapses.

12. The air flow control system of claim 11 wherein said controller is further operable to deactivate said air flow means and reset said timing means, if said timing means is not in a reset condition, in response to the vehicle speed exceeding said vehicle speed threshold.

13. The air flow control system of claim 12 wherein said means for providing air flow includes:

a fan; and a fan drive means responsive to a fan activation signal provided by said controller means to drive said fan and thereby provide air flow to the refrigerant condenser.

14. The air flow control system of claim 13 wherein said means for sensing the pressure of refrigerant received by the refrigerant condenser includes a pressure responsive switch operable between an open position and a closed position, said switch switching to said open position in response to sensing pressure in excess of said first pressure threshold, and switching to said closed position in response to sensing pressure below said second lower pressure threshold.

15. The air flow control system of claim 14 wherein said controller means is a microprocessor-based vehicle control computer.

16. In combination:

an internal combustion engine; and a system for controlling air flow to a cooling system of said internal combustion engine, said engine cooling system including a heat exchanger responsive to air flow therethrough to remove heat from fluid circulating through said engine cooling system, means for providing air flow to said heat exchanger, and a refrigerant condenser of an air conditioning unit operable to cool air within a passenger compartment of a vehicle carrying said engine, said heat exchanger being disposed between said air flow means and said condenser, said condenser being operable to receive pressurized refrigerant from said air conditioning unit, said air flow control system comprising:

means for sensing the pressure of refrigerant received by the refrigerant condenser and providing a pressure signal corresponding thereto;

means for sensing vehicle speed and providing a vehicle speed signal corresponding thereto; and controller means for controlling said air flow means in response to said vehicle speed and pressure signals, said controller means continuously activating said air flow means while the vehicle speed is below a first speed threshold if the refrigerant pressure exceeds a first pressure threshold, and activating said air flow means for a predetermined duration while the vehicle speed is above said first speed threshold but below a second higher speed threshold if the refrigerant pressure is above said first pressure threshold.

17. The combination of claim 16 wherein said controller means is further operable to activate said air flow means in response to the refrigerant pressure exceeding said first pressure threshold, and deactivating said air flow means in response to the refrigerant pressure falling below said second pressure threshold, while the vehicle speed is above said second speed threshold.

18. The combination of claim 17 wherein said means for providing air flow to said heat exchanger includes:

a fan; and a fan drive means responsive to a fan activation signal provided by said controller means to drive said fan and thereby provide air flow to said engine cooling system.

19. The combination of claim 18 wherein said means for sensing the pressure of refrigerant received by the refrigerant condenser includes a pressure responsive switch operable between an open position and a closed position, said switch switching to said open position in response to sensing pressure in excess of said first pressure threshold, and switching to said closed position in response to sensing pressure below said second lower pressure threshold.

20. The combination of claim 19 wherein said controller means is a microprocessor-based vehicle control computer.

21. The combination of claim 20 wherein said heat exchanger is a motor vehicle radiator.

22. The combination of claim 21 wherein said internal combustion engine is a diesel engine.

23. A method of controlling an air flow means for providing air flow to a refrigerant condenser of a vehicle air conditioning unit, the refrigerant condenser being operable to receive pressurized refrigerant from the air conditioning unit, the method comprising the steps of:

(1) determining the pressure of refrigerant received by the refrigerant condenser;

(2) determining vehicle speed;

(3) continuously activating the air flow means while the vehicle speed is below a first speed threshold if the refrigerant pressure is above a first pressure threshold; and (4) activating the air flow means for a predetermined duration while the vehicle speed is above said first speed threshold but below a second higher speed threshold if the refrigerant pressure is above said first pressure threshold.

24. The method of claim 23 further including the step of:

(5) activating the air flow means in response to the refrigerant pressure being above said first pressure threshold and deactivating the air flow means in response to the refrigerant pressure falling below a second lower pressure threshold while the vehicle speed is above said second speed threshold.

25. A method of controlling an air flow means for providing air flow to a refrigerant condenser of a vehicle air conditioning unit, the refrigerant condenser being operable to receive pressurized refrigerant from the air conditioning unit, the method comprising the steps of:

(1) determining the pressure of refrigerant received by the refrigerant condenser;

(2) determining vehicle speed;

(3) activating the air flow means for a predetermined duration while the vehicle speed is below a vehicle speed threshold if the refrigerant pressure is above a first pressure threshold; and (4) activating the air flow means in response to the refrigerant pressure being above said first pressure threshold and deactivating the air flow means in response to the refrigerant pressure falling below a second lower pressure threshold, while the vehicle speed is above said vehicle speed threshold.

* * * * *